(12) United States Patent
Tomita (10) Patent No.: US 7,821,678 B2
(45) Date of Patent: Oct. 26, 2010

(54) IMAGE FORMING APPARATUS CAPABLE OF PRODUCING A HIGH-PRECISION LIGHT BEAM WITH A SIMPLE STRUCTURE

(75) Inventor: Yasumasa Tomita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1084 days.

(21) Appl. No.: 11/516,526

(22) Filed: Sep. 7, 2006

(65) Prior Publication Data
US 2007/0052957 A1    Mar. 8, 2007

(30) Foreign Application Priority Data
Sep. 8, 2005    (JP)    ............................. 2005-260249

(51) Int. Cl.
    H04N 1/04    (2006.01)
(52) U.S. Cl. ....................... 358/474; 358/480; 358/475; 358/509; 359/212.2; 359/216.1; 356/247; 347/129; 347/229
(58) Field of Classification Search ................. 358/480, 358/481, 509, 475, 474; 250/234, 208.1; 359/212.2, 216.1, 204.1; 356/247; 347/129, 347/229, 235, 250, 245, 257, 198.1
See application file for complete search history.

(56) References Cited

U.S. PATENT DOCUMENTS

| | | | | |
|---|---|---|---|---|
| 5,394,173 | A * | 2/1995 | Kubota ........................ | 347/257 |
| 6,141,118 | A * | 10/2000 | Yamawaki et al. ........... | 358/481 |
| 6,891,559 | B1 * | 5/2005 | Bannai ........................ | 347/245 |
| 6,992,689 | B2 * | 1/2006 | Yamaguchi .................. | 347/235 |
| 7,038,194 | B2 | 5/2006 | Tomita | |
| 7,619,643 | B2 * | 11/2009 | Sakaue et al. ................ | 347/138 |
| 7,652,786 | B2 * | 1/2010 | Nomura ....................... | 358/1.5 |
| 2002/0126362 | A1 * | 9/2002 | Shimomura .................. | 359/196 |
| 2004/0145644 | A1 * | 7/2004 | Makino ....................... | 347/233 |

(Continued)

FOREIGN PATENT DOCUMENTS

JP    10-221627    8/1998

(Continued)

OTHER PUBLICATIONS

U.S. Appl. No. 10/733,246, filed Dec. 12, 2003, Serizawa.

(Continued)

*Primary Examiner*—Negussie Worku
(74) *Attorney, Agent, or Firm*—Harness, Dickey & Pierce, P.L.C.

(57) ABSTRACT

An image forming apparatus includes an image carrier and an optical scanning device. The optical scanning device generates an optical scanning beam and includes an enclosure. The enclosure includes a pair of arch-like-shaped supporting members. Inside the enclosure there are provided a light source for emitting a light beam, a light deflector for deflecting the light beam emitted from the light source so as to convert the light beam into the optical scanning beam, and at least one reflecting mirror for reflecting the optical scanning beam deflected by the light deflector to scan the image carrying surface of the image carrier. At least one of the reflecting mirrors includes a specific reflecting mirror having a light reflecting surface and mounted on the pair of arch-like-shaped supporting members at a position to reflect the optical scanning beam with the light reflecting surface toward the image carrying surface of the image carrier.

14 Claims, 6 Drawing Sheets

U.S. PATENT DOCUMENTS

| | | | |
|---|---|---|---|
| 2004/0223195 A1* | 11/2004 | Nomura | 358/509 |
| 2004/0239999 A1* | 12/2004 | Tanimura et al. | 358/474 |
| 2005/0105198 A1* | 5/2005 | Shim | 359/879 |
| 2005/0111065 A1 | 5/2005 | Tomita | |

FOREIGN PATENT DOCUMENTS

| | | |
|---|---|---|
| JP | 2000-227569 | 8/2000 |
| JP | 2000-292729 | 10/2000 |
| JP | 2002-182144 | 6/2002 |
| JP | 2003-121774 | 4/2004 |
| JP | 2004-102133 | 4/2004 |

OTHER PUBLICATIONS

U.S. Appl. No. 11/302,248, filed Dec. 14, 2005, Tomita.
European Search Report for corresponding case.

* cited by examiner

IMAGE FORMING APPARATUS CAPABLE OF PRODUCING A HIGH-PRECISION LIGHT BEAM WITH A SIMPLE STRUCTURE

PRIORITY STATEMENT

This patent specification is based on and claims priority under 35 U.S.C. §119 on Japanese patent application, No. JP2005-260249 filed on Sep. 8, 2005 in the Japan Patent Office, the entire contents of which are incorporated herein by reference.

BACKGROUND

1. Field

The present invention generally relates to an image forming apparatus, and more particularly to an image forming apparatus that produces a high-precision light beam with a relatively simple structure of an optical scanning system.

2. Discussion of the Background

There are several related art image forming apparatuses that utilize an optical scanning apparatus using a reflecting mirror which bends an optical path so that a laser beam is emitted onto a photoreceptor to form an image. However, if angular accuracy of the reflecting mirror is not high enough, the position of the laser beam in the subscanning direction emitted onto the photoreceptor will not be consistent, and the position of the image relative to printing paper will also vary. In order to correct the positional variations, it is necessary to adjust the image positions for each device. As a result, production efficiency will decrease. Furthermore, when the irradiation position relative to the photoreceptor varies, the optical path length changes accordingly, thereby increasing a beamspot diameter. This may also result in degradation of an image quality.

In view of this, in an optical scanning apparatus using a reflecting mirror, when preventing positional variations of the laser beam emitted onto the photoreceptor, Japanese Laid-Open Patent Application 2002-182144, for example, proposes ways in which mass-production process may be simplified by eliminating an adjustment process for adjustment of image positions. Furthermore, the image quality may be enhanced by stabilizing the laser spot diameter. In addition, Japanese Laid-Open Patent Application 2004-102133 proposes ways in which a highly accurate optical box may not be needed, and the angular accuracy in the beta direction may be maintained high with a simple structural modification. Furthermore, dependency of the angular accuracy in the beta direction on the width in the short edge direction of the reflecting mirror may be decreased.

An optical scanning apparatus which forms a light flux from a light source into a predetermined beamspot and exposes/scans the photoreceptor has a generally known structure, in which the light source, optical elements such as a rotary deflection device and a single or a plurality of reflecting mirrors are disposed in an optical box or an enclosure. In order to dispose the optical scanning apparatus having such elements within a limited space, the position of the reflecting mirror is limited and may be changed depending on the relative position of the optical scanning apparatus with respect to the photoreceptor. In such a positional condition, at least one of the reflecting mirrors is forced to be disposed such that the specular surface or the light reflecting surface thereof faces outside with respect to the optical box. However, in the related art, the rear surface of the mirror or the non-deposited surface is forced to be positioned and secured contacting the mirror mounting surface formed on the optical box.

Due to demands for the reflection surface accuracy and the reflectivity, glass material is normally used for the reflecting mirror. However, it is generally difficult to achieve high accuracy relative to the glass outer shape because of processing problems, and a margin of processing error of plus or minus 0.5 mm may be generated. Consequently, as described above, if the mirror rear surface is attached to the mirror mounting surface formed on the optical box so as to position the mirror, the mirror may not be positioned at a desired position, causing the position of the beamspot to vary. Consequently, erroneous positioning of the images may occur. In addition, if the mirror is not disposed at the specified position, the light path may change so that the diameter of the beamspot increases, and the image may be deteriorated. In a case where the specular surface of the reflecting mirror is forced to face outside with respect to the optical box, an alternative method may be implemented. In the alternative method, an opening from which the light path is scanned may be provided on the outer wall of the optical box so that the mirror may be installed from outside thereof. However, because of the opening, it is unavoidable that the strength of the optical box decreases. Needless to say, the mounting area for the reflecting mirror needs to have high stiffness. If the strength of the optical box is not sufficient enough, vibration of the reflecting mirror itself may increase, thereby causing image degradation such as jitter.

Figure 1:
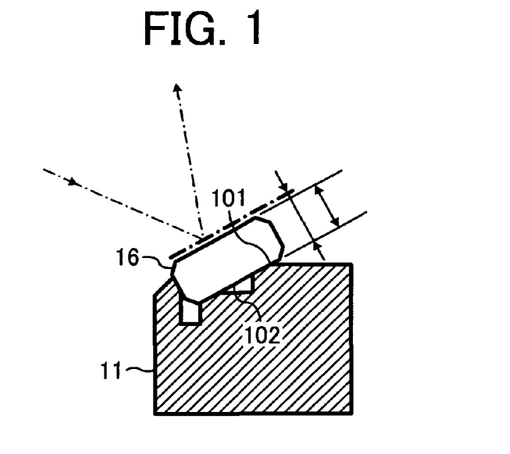
FIG. 1 is a partial cross-sectional view illustrating a related art mounting structure of a reflecting mirror.

In such a manner, as shown in FIG. 1, as a result of disposing the specular surface or the light reflecting surface of a reflecting mirror 16 facing outside of an optical box or an enclosure 11, a reflecting mirror rear surface 101, that is, the surface which is not a deposition surface of the reflecting mirror 16, is forced to come into contact with a mirror aligning plane or a reference surface 102 formed on the optical box 11 so that the reflecting mirror 16 is positioned and secured. Furthermore, when the reflecting mirror 16 is positioned, the mirror installation position may not be positioned at a predetermined position due to an error in thickness of the reflecting mirror 16 shown by an arrow in FIG. 1. As a result, the position of a beamspot may vary, thereby causing misalignment of images.

Figure 2:
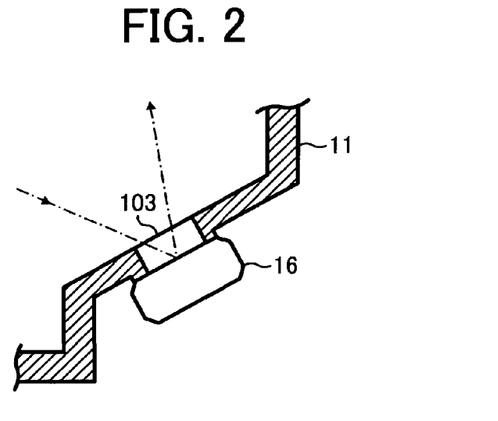
FIG. 2 is a partial cross-sectional view of another related art mounting structure of the reflecting mirror.

Furthermore, when the mirror installation position is not positioned at a desired position, a light path changes, thereby increasing a beamspot diameter. As a result, deterioration of an image is generated. As an alternative method to avoid the positioning by forcing the reflecting mirror rear surface 101, that is, the surface which is not the deposition surface of the reflecting mirror 16, to come into contact with the mirror aligning plane 102, as shown in FIG. 2, a window 103 for allowing to scan the light path may be provided in an outer wall of the optical box 11 so that the reflecting mirror 16 may be installed from outside the optical box 11. However, the width of the window 103 needs to have a span larger than a scan width. Consequently, deterioration of the strength of the optical box 11 may not be avoided. In other words, an installation portion, on which the reflecting mirror 16 is installed, needs to have high stiffness. When the strength is not sufficient enough, shaking of the reflecting mirror 16 is increased. As a result, deterioration of images such as jitter may be generated.

SUMMARY

At least one example embodiment of the present invention provides a novel image forming apparatus which is capable of producing a high-precision light beam with a simple structure.

In one example embodiment, a novel image forming apparatus may include an image carrier and an optical scanning device. The image carrier has an image carrying surface and is configured to form an electrostatic latent image on the image carrying surface with an optical scanning beam. The optical scanning device is configured to generate the optical scanning beam and includes an enclosure, a light source, a light deflector and at least one reflecting mirror. The enclosure includes a pair of arch-like-shaped supporting members. The light source is mounted inside the enclosure and emits a light beam. The light deflector is mounted inside the enclosure and is configured to deflect the light beam emitted from the light source so as to convert the light beam into the optical scanning beam. At least one reflecting mirror is mounted inside the enclosure and is configured to reflect the optical scanning beam deflected by the light deflector to scan the image carrying surface of the image carrier. At least one of the reflecting mirrors includes a specific reflecting mirror having a light reflecting surface and mounted on the pair of arch-like-shaped supporting members at a position to reflect the optical scanning beam with the light reflecting surface toward the image carrying surface of the image carrier.

In one example embodiment of the image forming apparatus, the pair of arch-like-shaped supporting members include a reference inner surface and are configured to fix the specific reflecting mirror at a predetermined position in a way such that the light reflecting surface of the specific reflecting mirror closely contacts the reference inner surface of each of the pair of arch-like-shaped supporting members.

In one example embodiment of the image forming apparatus, the pair of arch-like-shaped supporting members are integrally formed with the enclosure. Accordingly, separate parts for mounting the mirror may not be necessary, and cost reduction may be attained. Furthermore, highly accurate positioning of the mirror may be made possible.

In one example embodiment of the image forming apparatus, the enclosure further includes a die-cutting opening arranged on a surface on which each of the pair of arch-like-shaped supporting members is formed. Accordingly, a simple mold structure is attained.

In one example embodiment of the image forming apparatus, the die-cutting opening is provided substantially at a base of each of the pair of arch-like-shaped supporting members so that deterioration of the strength of the enclosure may be prevented, and vibration of the mirror may be reduced.

In one example embodiment of the image forming apparatus, the enclosure further includes at least one rib provided in a vicinity to each of the pair of arch-like-shaped supporting members and connected to each of the pair of arch-like-shaped supporting members so as to increase a structural strength of the enclosure.

In one example embodiment of the image forming apparatus, the optical scanning device includes a pair of leaf springs attached to respective longitudinal ends of the specific reflecting mirror.

In one example embodiment of the image forming apparatus, the enclosure further includes a pair of stoppers which are respectively arranged outside the pair of arch-like-shaped supporting members and is configured to lock the pair of leaf springs so that the pair of leaf springs substantially evenly pushes the specific reflecting mirror in the respective longitudinal ends towards the reference inner surface of the pair of arch-like-shaped supporting members.

In one example embodiment of the image forming apparatus, each of the pair of leaf springs is inserted through a side opening of a corresponding one of the pair of arch-like-shaped supporting members and is fixedly clipped on a corresponding one of the pair of stoppers of the enclosure. Accordingly, screws for fastening the leaf springs may not be necessary, and a simple mounting structure is attained. The number of parts may also be reduced.

In one example embodiment, an optical scanning apparatus includes an enclosure, a light source, a light deflector and at least one reflecting mirror. The enclosure includes a pair of arch-like-shaped supporting members. The light source is mounted inside the enclosure and emits a light beam. A light deflector is mounted inside the enclosure and is configured to deflect the light beam emitted from the light source so as to convert the light beam into an optical scanning beam for scanning an external imaging surface. At least one reflecting mirror is mounted inside the enclosure and is configured to reflect the optical scanning beam deflected by the light deflector to scan the external imaging surface. The at least one reflecting mirror includes a specific reflecting mirror having a light reflecting surface and is mounted on the pair of arch-like-shaped supporting members at a position to reflect the optical scanning beam with the light reflecting surface toward the external imaging surface.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, wherein.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. For the sake of simplicity of drawings and descriptions, the same reference numerals are given to materials and constituent parts having the same functions, and descriptions thereof will be omitted unless otherwise stated. Example embodiments of the present invention are now explained below with reference to the accompanying drawings. In the later described comparative example, example embodiment, and alternative example, the same reference numerals will be given to constituent elements such as parts and materials having the same functions, and the descriptions thereof will be omitted. Referring now to the drawings, wherein like reference numerals designate identical or corresponding parts throughout the several views, particularly to FIG. 3, an optical scanning apparatus according to an example embodiment of the present invention is described.

Figure 3:
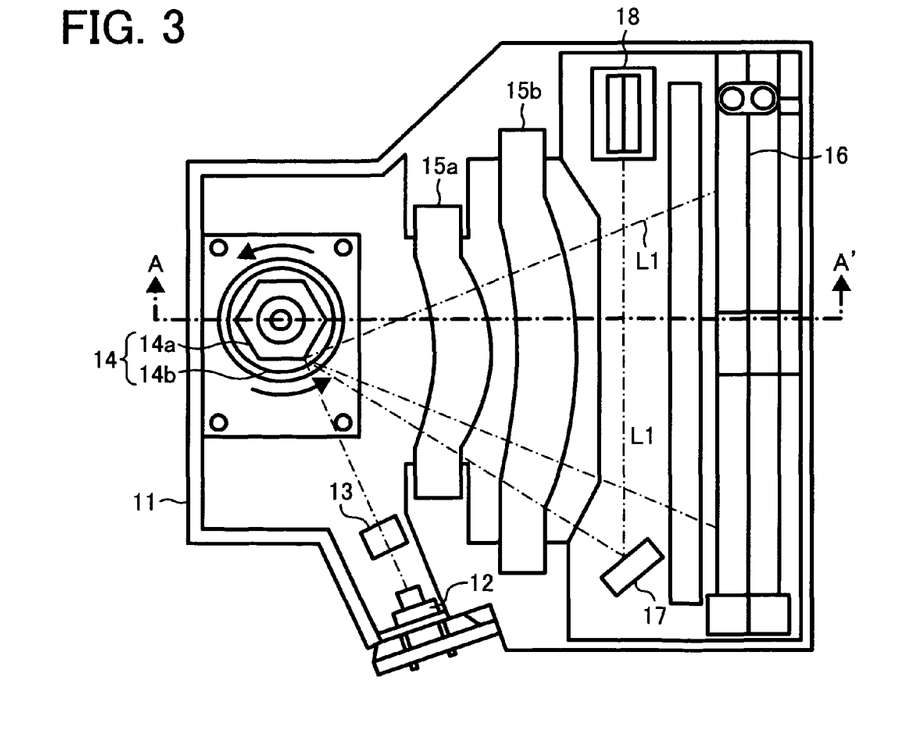
FIG. 3 is a schematic diagram of an optical scanning apparatus according to an example embodiment of the present invention.
Figure 4:
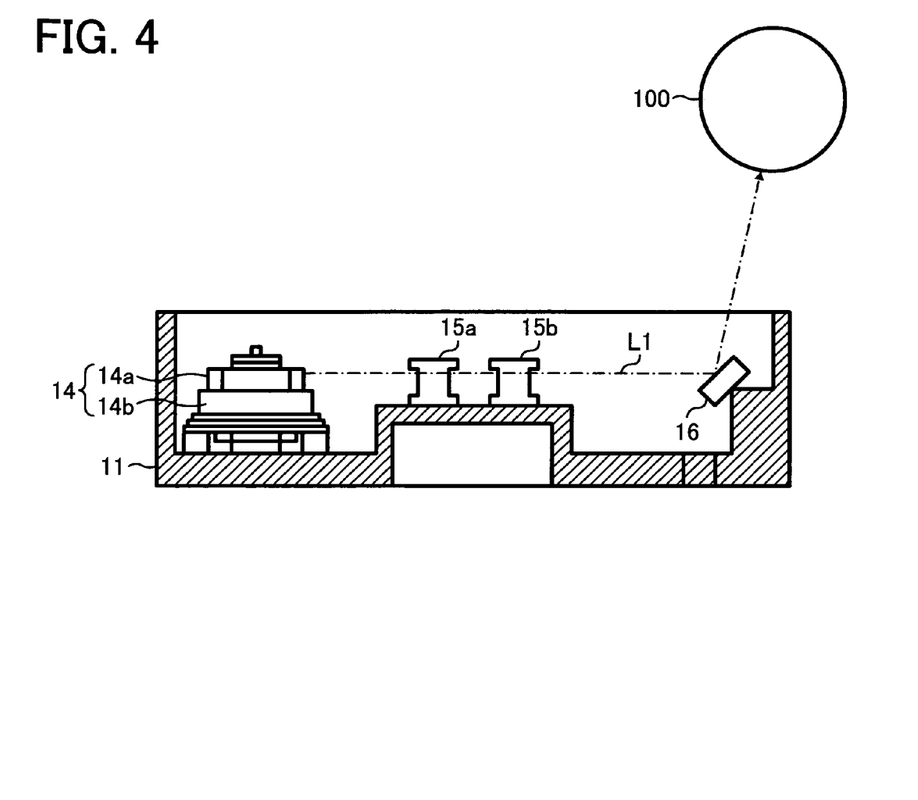
FIG. 4 is a cross-sectional view taken along line A-A' of FIG. 3.

FIG. 3 illustrates a structure of a general optical scanning apparatus. FIG. 4 is a cross-sectional view taken along line A-A' in FIG. 3. In both figures, a light source 12 which emits a laser beam L1 is installed in an optical box or an enclosure 11. Along a traveling direction of the laser beam L1 from the light source 12, a cylindrical lens 13 and a rotary deflecting unit 14 are disposed. The cylindrical lens 13 focuses the laser beam L1 to a subscanning direction. The rotary deflecting unit 14 deflects and scans the laser beam from the cylindrical lens 13. The rotary deflecting unit 14 includes a polygon mirror 14a which reflects the laser beam, and a drive motor 14b which rotationally drives the polygon mirror 14a. In the optical box 11, along the traveling direction of the laser beam L1 which is deflected and scanned by the rotary deflecting unit 14, there are provided scan lenses 15a and 15b, a reflecting mirror 16, a light detecting mirror 17 and a light detecting unit 18. The scan lenses 15a and 15b are formed of an fθ lens which images the laser beam L1 on a photoreceptor drum 100, and a lens for optical face tangle error correction. The reflecting mirror 16 reflects the incident laser beam L1 to the photoreceptor drum 100. The light detecting mirror 17 reflects the laser beam before being irradiated onto the photoreceptor drum 100. The light detecting unit 18 detects the laser beam L1 from the light detecting mirror 17.

In such an optical scanning apparatus described above, the optical laser beam L1 from the light source 12 is deflected and scanned by the rotary deflecting unit 14. Subsequently, the optical beam L1 is imaged on the photoreceptor drum 100 through the scan lenses 15a and 15b and the reflecting mirror 16, and is exposed. In the optical scanning apparatus, a specular surface or a light reflecting surface of the reflecting mirror 16 is disposed facing outside of the optical box 11. In other words, the specular surface of the reflecting mirror 16 is disposed at a position to reflect the laser beam L1.

Figure 5:
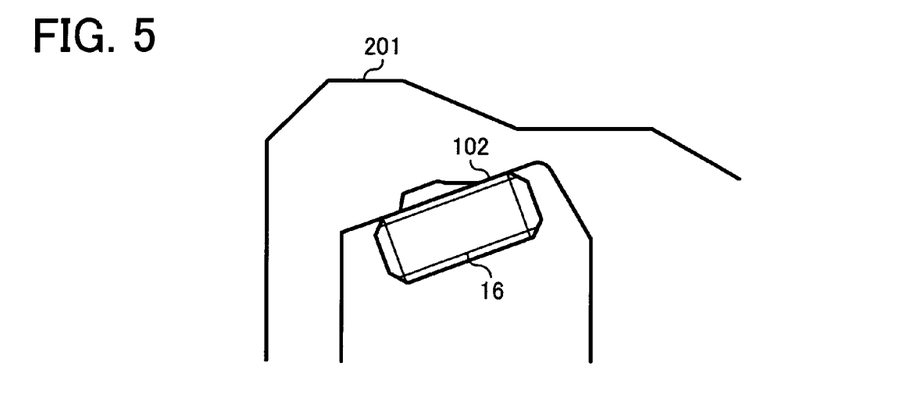
FIG. 5 is a partial cross-sectional view of an optical scanning apparatus according to an example embodiment of the present invention.

FIG. 5 illustrates an installation of a reflecting mirror of an optical scanning apparatus of one example embodiment of the present invention. As shown in FIG. 5, a pair of protrusions or supporting members 201 having an arch-like shape are provided at the installation area on which the reflecting mirror 16 is installed inside the optical box 11. Inside the arch-like shape protrusions 201, the mirror aligning plane 102 configured to position the reflecting mirror 16 at the predetermined position is provided. In such a manner, the specular surface of the reflecting mirror 16 comes into contact with the mirror aligning plane 102, so that the reflecting mirror 16 is positioned and fixed. According to the above-described structure, even if the specular surface of the reflecting mirror 16 is disposed facing outside the optical box 11, the reflecting mirror 16 is securely positioned at the predetermined position, and an angle of the reflecting mirror 16 is fixed at a desired position. As a result, positional variations of the laser beams irradiated on the photoreceptor drum in the subscanning direction, image skew relative to printing paper, and fluctuations of the subscanning resist position may be reduced. Furthermore, the length of the light path, in which the laser beam reaches the photoreceptor drum, may be configured to have a predetermined length so that it is possible to prevent degradation of image quality due to an enlargement of the beamspot diameter as a result of fluctuations in the light path.

The arch-like shape protrusions or supporting members 201 disposed in the optical box 11 are integrally formed with the optical box 11. Generally, the optical box 11 is molded as a single member made from resin or die-cast.

As described above, the arch-like shape protrusions 201 are provided such that the specular surface of the reflecting mirror 16 is positioned contacting the mirror aligning plane 102 formed in the optical box 11. If the arch-like shape protrusions 201 are integrally formed with the optical box 11, the number of parts may be reduced, and the mirror position may be highly accurately specified. Accordingly, cost reduction of the apparatus may be attained.

Figure 6:
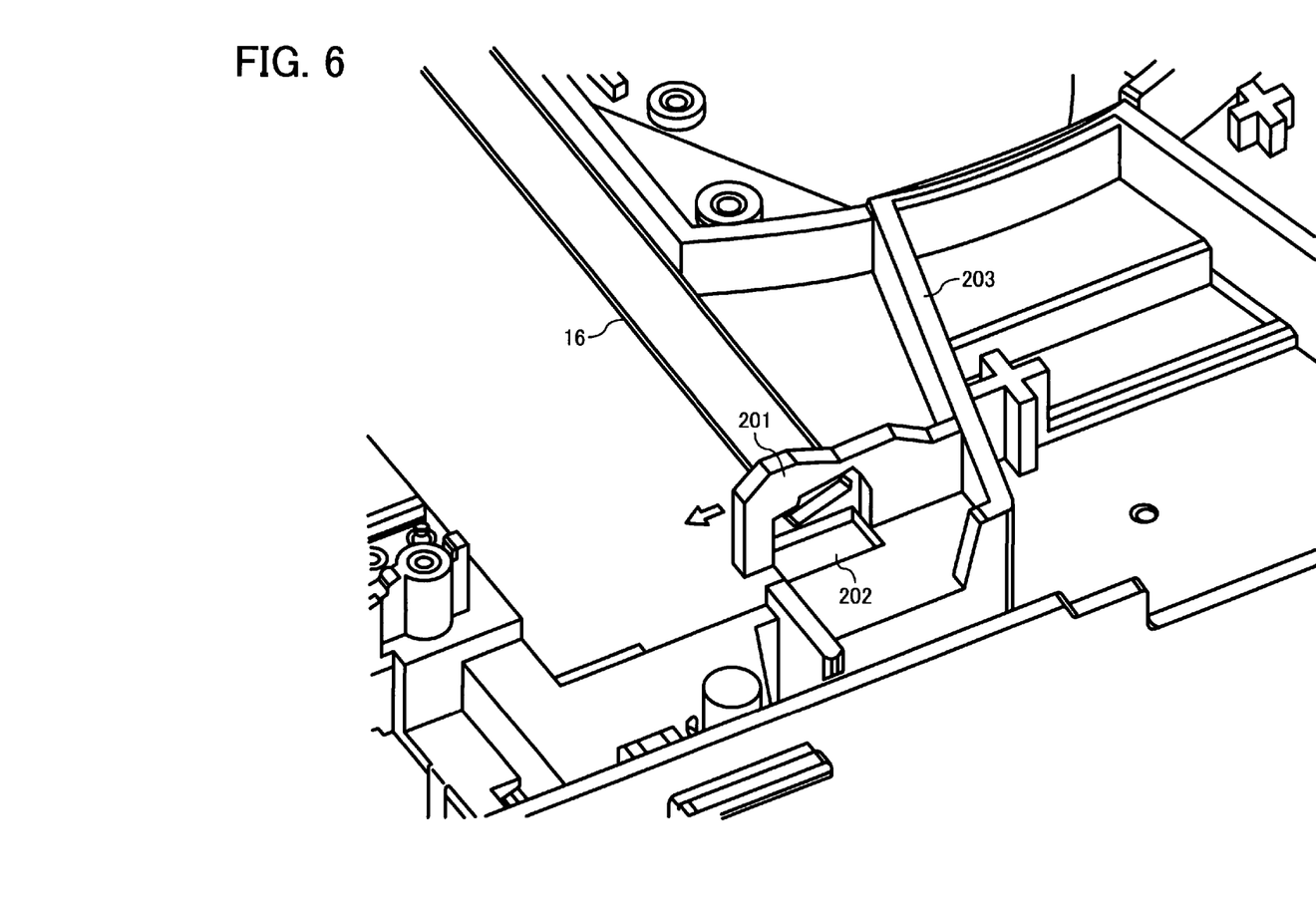
FIG. 6 is a partial perspective view of the optical scanning apparatus according to the example embodiment of the present invention.

Furthermore, as shown in FIG. 6, on a plane on which the arch-like shape protrusions 201 are disposed in the optical box 11, an opening or die-cutting opening 202 is provided for removal of the mold. If the arch-like shape protrusions 201 are a molded member made of resin or die-cast as described above, in order to integrally form the arch-like shape protrusions 201, the mold that may slidably be retrieved from the side is necessary, causing complication of the mold structure and ultimately increasing parts cost. However, if the opening 202 for removal of the mold is provided in the plane in which the arch-like shape protrusions 201 are formed, a molding structure having an installation bearing surface is attained relative to the opening 202 so that it is possible to simply split the mold into two directions, that is, an upper mold piece and a lower mold piece. Accordingly, a simple molding structure may be attained.

As shown in FIG. 6, the opening 202 positions the both end portions of the reflecting mirror 16 in the longitudinal direction thereof. The opening 202 may be provided across an entire surface of the span of the arch-like shape protrusions 201 being fixed. In this case, the dimension of the opening 202 in the optical box 11 is increased. As a result, the strength of the optical box 11 may be deteriorated. In other words, vibration of the mirror may be increased. For this reason, as shown in FIG. 6, the opening 202 for removal of the mold is formed at the base of the arch-like shape protrusions 201. Accordingly, it is possible to decrease the dimension of the opening 202 as much as possible so that it is possible to prevent deterioration of the strength of the optical box 11 and vibration of the mirror. In addition, in the vicinity of the arch-like shape protrusions 201 provided in the optical box 11, at least one rib 203 for enhancing the strength of the optical box 11 is provided and connected to the arch-like shape protrusions 201. Accordingly, the stiffness of the mirror mounting portion is enhanced. Thereby, the image deterioration such as jitter caused by the vibration of the optical box may effectively be prevented.

Figure 7:
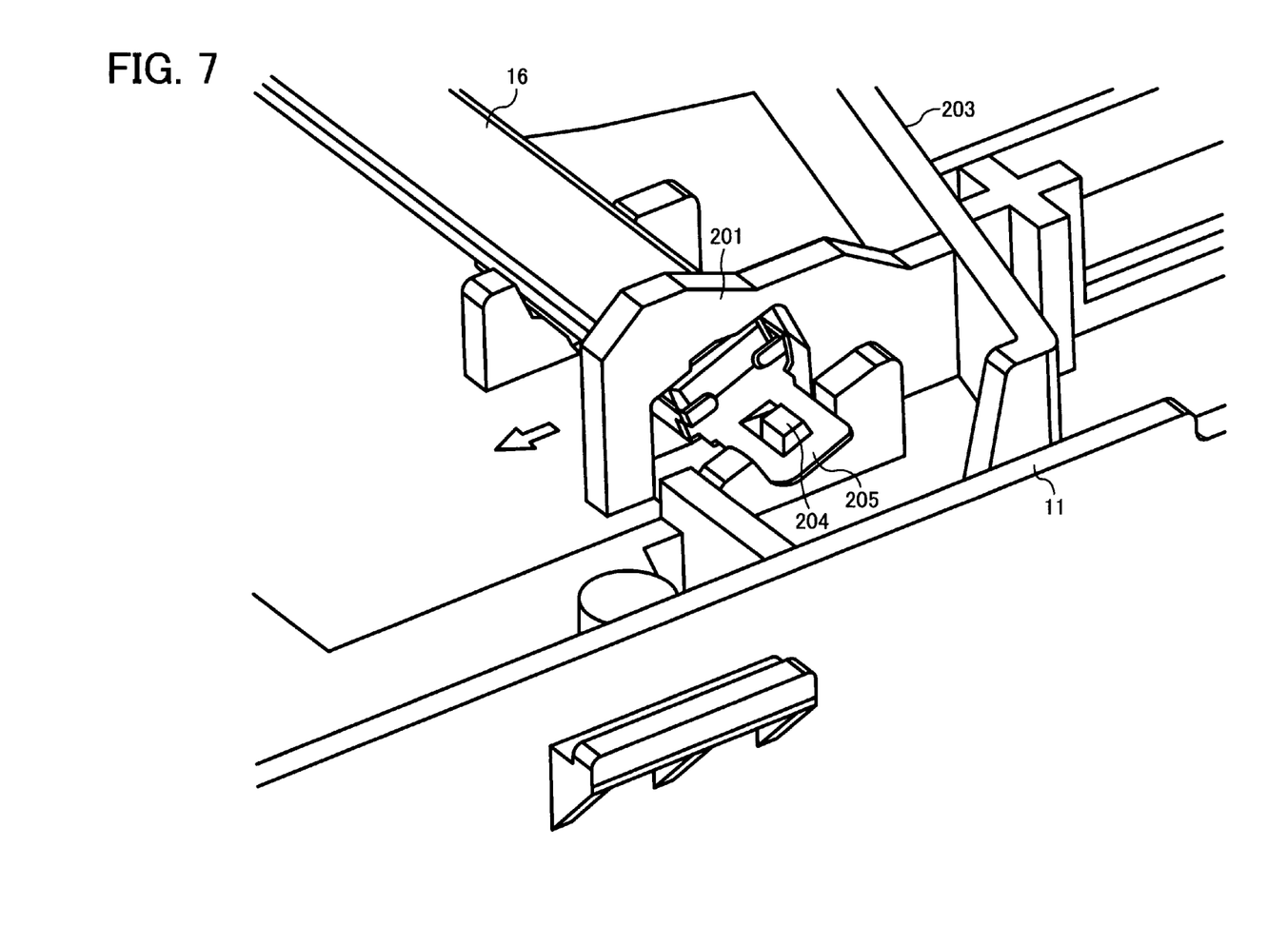
FIG. 7 is a partially enlarged perspective view illustrating installation of a reflecting mirror of the optical scanning apparatus according to the example embodiment of the present invention.

As shown in FIG. 7, the reflecting mirror 16 is held by leaf springs 205 which are engaged with locking members 204 provided at both ends of the arch-like shape protrusions 201. The leaf springs 205 are inserted from the side of the arch-like shape protrusions 201 and are clipped. The reflecting mirror rear surface or the surface which is not the deposited surface is pressed by the leaf springs 205 engaged with the locking members 204 provided at both ends of the arch-like shape protrusions 201. Accordingly, the reflecting mirror 16 is securely mounted.

Figure 8:
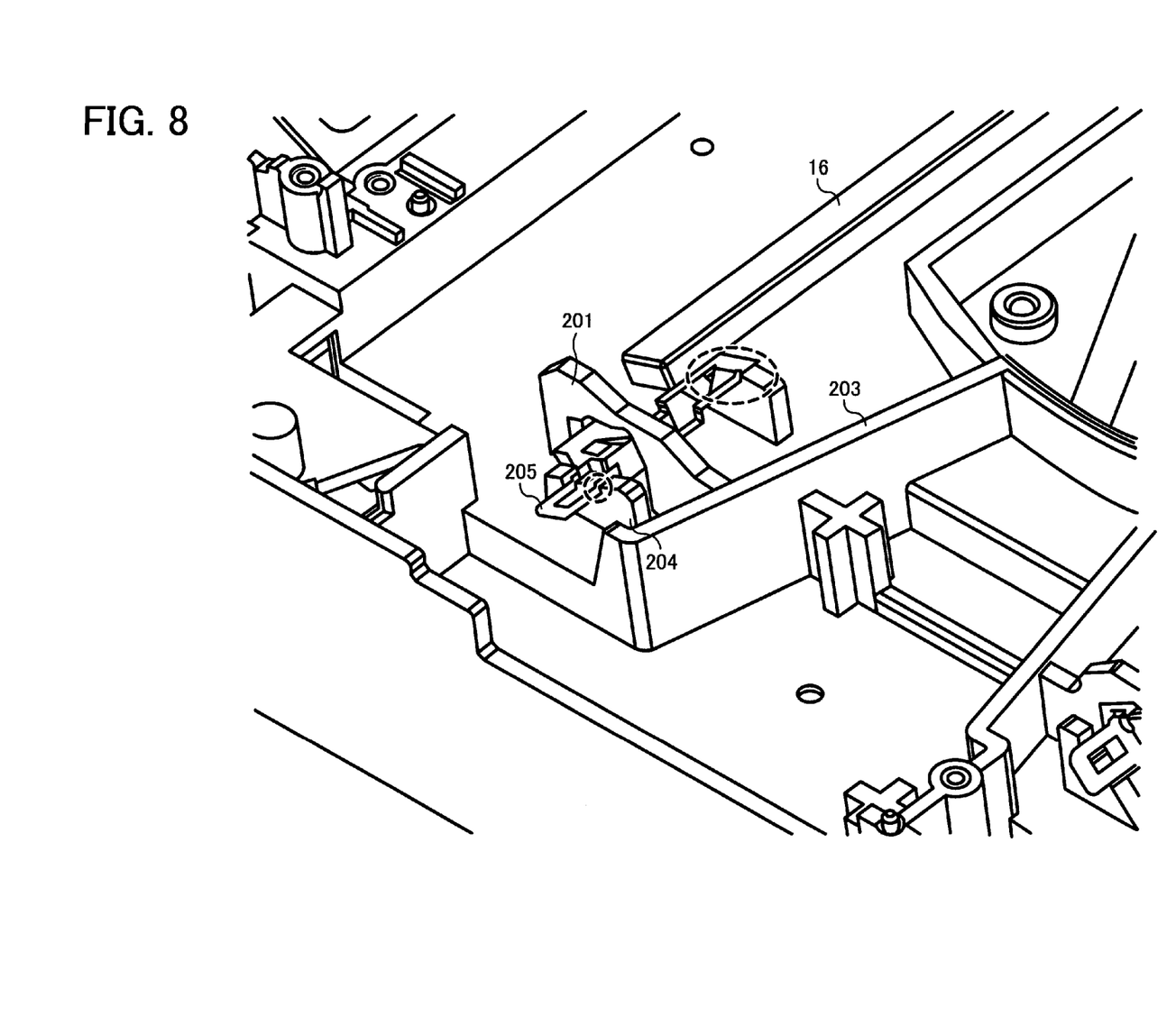
FIG. 8 is a partial perspective view of installation of a leaf spring of the optical scanning apparatus according to the example embodiment of the present invention

As described above, it is known that the thickness tolerance of the thickness of the reflecting mirror 16 may be relatively large depending on processing accuracy. Consequently, a margin of processing error of plus or minus 0.5 mm is inevitably generated. In light of this, the reflecting mirror 16 is mounted such that the mirror rear surface or the surface which is not the deposited surface is pressed by the leaf springs 205 so that the reflecting mirror 16 is securely positioned and fixed within the elasticity region of the leaf springs 205. Even if the thickness of the mirror varies, it is possible to always accurately position the reflecting mirror 16 at a certain position. As shown in FIG. 8, the leaf springs 205 are inserted from the side of the arch-like shape protrusions 201 and are clipped in the area indicated by a dotted line in FIG. 8 so that screws to secure the leaf springs 205 will not be necessary. Therefore, a simple structure is attained. Furthermore, it is possible to decrease the number of parts. In addition, even in a case where the reflecting mirror 16 needs to be replaced due to a defect or a scratch, the reflecting mirror 16 may easily be removed and be replaced by releasing the clipped leaf springs 205.

Figure 9:
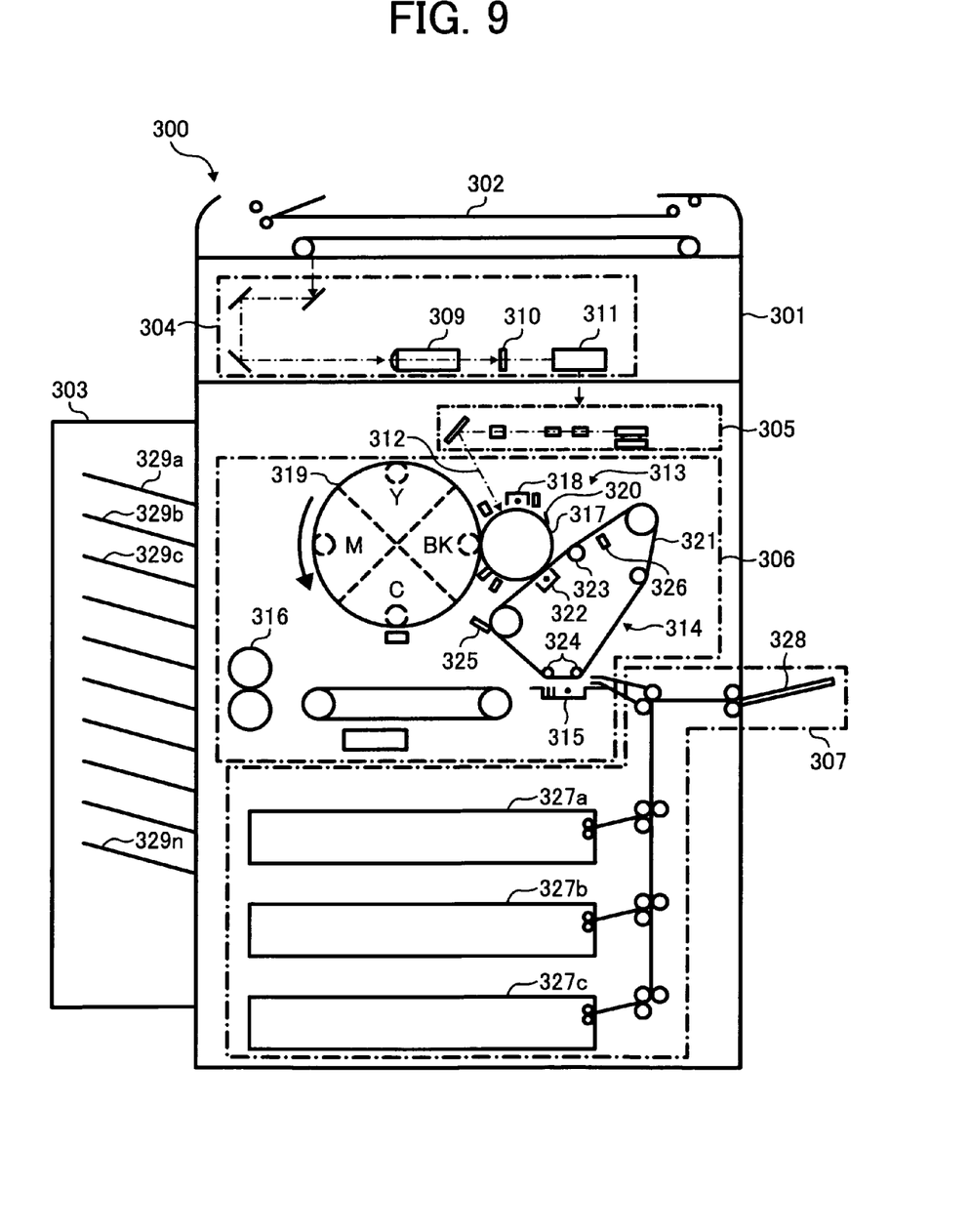
FIG. 9 is a schematic diagram illustrating an example image forming apparatus according to an example embodiment of the present invention.

FIG. 9 is a cross-sectional view of a structure of another image forming apparatus to which the present invention may be applied. As shown in FIG. 9, a digital copier 300 includes the digital copier main body 301, an automatic document feeder (hereinafter referred to as ADF) 302 and an automatic sorting unit 303. The digital copier main body 301 includes a document reading unit 304, an above-described optical scanning apparatus 305, an engine unit 306 and a paper feeding unit 307. The document reading unit 304 includes a lens 309, a CCD 310 and a buffer 311. The document reading unit 304 scans to read the document fed by the ADF 302. The optical scanning apparatus 305 includes a light source, a polygon mirror and so forth, and emits a laser beam 312 to the engine unit 306. The engine unit 306 includes an image forming unit 313, a primary transfer unit 314, a secondary transfer unit 315 and a fixing unit 316.

The image forming unit 313 includes, surrounding a photoreceptor 317, a charger 318, an irradiation area onto which the laser beam 312 is emitted from the optical scanning apparatus 305, color developing units 319 for each of colors cyan (C), magenta (M), yellow (Y) and black (BK), and a drum cleaning device 320. An electrostatic latent image is formed by the laser beam 312 on the photoreceptor 317 charged by the charger 318. Then, the formed electrostatic latent image is visualized in the color developing units 319 so as to form a toner image.

The primary transfer unit 314 includes an intermediate transfer belt 321, a primary transfer unit 322, a tension roller 323, secondary transfer rollers 324, a cleaning unit 325 and an aligning sensor 326. The primary transfer unit 314 carries out an initial transfer of toner images formed on the photoreceptor 317 to the intermediate transfer belt 321. The intermediate transfer belt 321 is configured to be larger than A3 size which is the largest transfer paper size in the digital copier 300. Therefore, when the size of the transfer paper to be used is smaller than or equal to A4 size, the intermediate transfer belt 321 may carry the toner images equivalent of two sides.

Except for when carrying out the initial transfer of the toner images on the photoreceptor 317, the intermediate transfer belt 321 is separated from the surface of the photoreceptor 317 by a not-shown releasing mechanism. Only when carrying out the initial transfer of toner images onto the intermediate transfer belt 321, the intermediate transfer belt 321 is pressed against the surface of the photoreceptor 317. The secondary transfer unit 315 carries out the secondary transfer of the toner images which have been transferred onto the intermediate transfer belt 321 on recording paper. The fixing unit 316 fixes the toner images transferred onto the recording paper by applying heat and pressure.

The paper feeding unit 307 includes a plurality of paper feeding cassettes 327a through 327c and a manual feeding tray 328. The paper feeding unit 307 sends the recording paper to the secondary transfer unit 315. The ADF 302 sends the document to be read to the document reading unit 304, and recovers the document having been read by the document reading unit 304. The automatic sorting unit 303 includes a plurality of bins 329a through 329n, sorts and ejects the recording paper on which images are formed.

The optical scanning apparatus of the present invention described above may be installed in the image forming apparatus having such an above-described structure. Consequently, highly accurate positioning of the mirror mounting position may be attained, and image deterioration due to vibrations of the optical box may be prevented. Furthermore, it is possible to provide an image forming apparatus at low cost and an image forming apparatus which facilitates simplification of the mounting structure.

Embodiments of this invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. Embodiments of the present invention may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods, when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image forming apparatus, comprising:
   an image carrier including an image carrying surface and configured to form an electrostatic latent image on the image carrying surface with an optical scanning beam;
   an optical scanning device configured to generate the optical scanning beam, and including,
      an enclosure including a pair of arch-like-shaped supporting members,
      a light source mounted inside the enclosure and emitting a light beam,
      a light deflector mounted inside the enclosure and configured to deflect the light beam emitted from the light source so as to convert the light beam into the optical scanning beam,
      at least one reflecting mirror mounted inside the enclosure and configured to reflect the optical scanning beam deflected by the light deflector to scan the image carrying surface of the image carrier, the at least one reflecting mirror including a specific reflecting mirror having a light reflecting surface and mounted on the pair of arch-like-shaped supporting members at a position to reflect the optical scanning beam with the light reflecting surface toward the image carrying surface of the image carrier,
      a pair of leaf springs attached to respective longitudinal ends of the specific reflecting mirror, and
      wherein the enclosure further includes a pair of stoppers respectively arranged outside the pair of arch-like-shaped supporting members and configured to stop the pair of leaf springs so that the pair of leaf springs substantially evenly pushes the specific reflecting mirror in the respective longitudinal ends towards the reference inner surface of the pair of arch-like-shaped supporting members.

2. The image forming apparatus of claim 1, wherein the pair of arch-like-shaped supporting members each include a reference inner surface and are configured to fix the specific reflecting mirror at a predetermined position in a way such that the light reflecting surface of the specific reflecting mirror closely contacts the reference inner surface of each of the pair of arch-like-shaped supporting members.

3. The image forming apparatus of claim 1, wherein the pair of arch-like-shaped supporting members are integrally formed with the enclosure.

4. The image forming apparatus of claim 1, wherein the enclosure further includes a die-cutting opening arranged in a surface on which each of the pair of arch-like-shaped supporting members is formed.

5. The image forming apparatus of claim 4, wherein the die-cutting opening is provided substantially at a base of each of the pair of arch-like-shaped supporting members.

6. The image forming apparatus of claim 1, wherein the enclosure further includes at least one rib provided in a vicinity to each of the pair of arch-like-shaped supporting members and connected to each of the pair of arch-like-shaped supporting members so as to increase a structural strength of the enclosure.

7. The image forming apparatus of claim 1, wherein each of the pair of leaf springs is inserted through a side opening of a corresponding one of the pair of arch-like-shaped supporting members and is fixedly clipped on a corresponding one of the pair of stoppers of the enclosure.

8. An optical scanning apparatus, comprising:
   an enclosure including a pair of arch-like-shaped supporting members,
   a light source mounted inside the enclosure and emitting a light beam,
   a light deflector mounted inside the enclosure and configured to deflect the light beam emitted from the light source so as to convert the light beam into an optical scanning beam for scanning an external imaging surface,
   at least one reflecting mirror mounted inside the enclosure and configured to reflect the optical scanning beam deflected by the light deflector to scan the external imaging surface, the at least one reflecting mirror including a specific reflecting mirror having a light reflecting surface and mounted on the pair of arch-like-shaped supporting members at a position to reflect the optical scanning beam with the light reflecting surface toward the external imaging surface,
   a pair of leaf springs attached to respective longitudinal ends of the specific reflecting mirror, and
   wherein the enclosure further includes a pair of stoppers respectively arranged outside the pair of arch-like-shaped supporting members and configured to stop the pair of leaf springs so that the pair of leaf springs substantially evenly pushes the specific reflecting mirror in the respective longitudinal ends towards the reference inner surface of the pair of arch-like-shaped supporting members.

9. The optical scanning apparatus of claim 8, wherein the pair of arch-like-shaped supporting members each include a reference inner surface and are configured to fix the specific reflecting mirror at a predetermined position in a way such that the light reflecting surface of the specific reflecting mirror closely contacts the reference inner surface of each of the pair of arch-like-shaped supporting members.

10. The optical scanning apparatus of claim 8, wherein the pair of arch-like-shaped supporting members are integrally formed with the enclosure.

11. The optical scanning apparatus of claim 8, wherein the enclosure further includes a die-cutting opening arranged in a surface on which each of the pair of arch-like-shaped supporting members is formed.

12. The optical scanning apparatus of claim 11, wherein the die-cutting opening is provided substantially at a base of each of the pair of arch-like-shaped supporting members.

13. The optical scanning apparatus of claim 8, wherein the enclosure further includes at least one rib provided in a vicinity to each of the pair of arch-like-shaped supporting members and connected to each of the pair of arch-like-shaped supporting members so as to increase a structural strength of the enclosure.

14. An image forming apparatus, comprising:
   an image carrier including an image carrying surface and configured to form an electrostatic latent image on the image carrying surface with an optical scanning beam;
   an optical scanning device configured to generate the optical scanning beam, and including
      an enclosure including a pair of arch-like-shaped supporting members and a die-cutting opening arranged in a surface on which each of the pair of arch-like-shaped supporting members is formed, a light source mounted inside the enclosure and emitting a light beam, a light deflector mounted inside the enclosure and configured to deflect the light beam emitted from the light source so as to convert the light beam into the optical scanning beam, at least one reflecting mirror mounted inside the enclosure and configured to reflect the optical scanning beam deflected by the light deflector to scan the image carrying surface of the image carrier, the at least one reflecting mirror including a specific reflecting mirror having a light reflecting surface and mounted on the pair of arch-like-shaped supporting members at a position to reflect the optical scanning beam with the light reflecting surface toward the image carrying surface of the image carrier.

* * * * *